(12) United States Patent
Hunter et al.

(10) Patent No.: US 7,634,515 B2
(45) Date of Patent: Dec. 15, 2009

(54) DATA MODEL AND SCHEMA EVOLUTION

(75) Inventors: Jason T. Hunter, Redmond, WA (US); Sergey Melnik, Kirkland, WA (US); Ramachandran Venkatesh, Bellevue, WA (US); David J. Nettleton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 11/128,893

(22) Filed: May 13, 2005

(65) Prior Publication Data

US 2006/0259458 A1 Nov. 16, 2006

(51) Int. Cl.
*G06F 12/00* (2006.01)
*G06F 17/30* (2006.01)

(52) U.S. Cl. ...................................... 707/203
(58) Field of Classification Search ................. 707/203
See application file for complete search history.

(56) References Cited

U.S. PATENT DOCUMENTS

| | | | |
|---|---|---|---|
| 5,315,709 A * | 5/1994 | Alston et al. ................... 707/6 |
| 5,548,761 A * | 8/1996 | Balasundaram et al. ..... 717/159 |
| 5,937,410 A * | 8/1999 | Shen ...................... 707/103 R |
| 6,553,141 B1 * | 4/2003 | Huffman ................... 382/232 |
| 6,910,182 B2 * | 6/2005 | Huang ........................ 715/514 |
| 7,096,229 B2 | 8/2006 | Dettinger |
| 2002/0194220 A1 * | 12/2002 | Sluiman ...................... 707/513 |
| 2003/0018964 A1 * | 1/2003 | Fox et al. ................... 717/177 |
| 2003/0051226 A1 | 3/2003 | Zimmer |
| 2003/0121026 A1 | 6/2003 | Wang |
| 2003/0167444 A1 | 9/2003 | Zorc |
| 2004/0015511 A1 | 1/2004 | Seefeldt |
| 2004/0044990 A1 | 3/2004 | Schloegel |
| 2004/0073870 A1 | 4/2004 | Fuh |
| 2004/0139126 A1 | 7/2004 | Thacker |
| 2005/0014494 A1 | 1/2005 | Owen |
| 2005/0050020 A1 * | 3/2005 | Oki et al. ...................... 707/3 |
| 2005/0091255 A1 | 4/2005 | Rajan |
| 2005/0262378 A1 | 11/2005 | Sleeman |
| 2005/0289157 A1 | 12/2005 | Vachillo |
| 2006/0064425 A1 | 3/2006 | Kakivaya |
| 2006/0184571 A1 | 8/2006 | Liu |
| 2006/0195459 A1 | 8/2006 | Nori |
| 2006/0195477 A1 | 8/2006 | Deem |

(Continued)

OTHER PUBLICATIONS

Ferrandia, et al., "Implementing Lazy Database Updates For An Object Database System", In Proceedings of the 20th International Conference on Very Large Data Bases, 1994, pp. 261-272, Santiago, Chile.

(Continued)

*Primary Examiner*—Isaac M. Woo
*Assistant Examiner*—Van H Ngo
(74) *Attorney, Agent, or Firm*—Workman Nydegger

(57) ABSTRACT

Systems and methodologies that facilitate evolving a data model via a combination of an explicit logical model definition, logical model changes, functional units, an explicit/implicit physical model and physical model changes, to derive a data model transformation are presented. Such an arrangement can provide for a rich set of transformations, which can be automatically applied to a data model instantiation. The subject invention facilitates leveraging a common set of code in data model instantiation evolution, by defining the set of transformations across an arbitrary data model.

20 Claims, 10 Drawing Sheets

U.S. PATENT DOCUMENTS

2006/0200486 A1    9/2006    Castro

OTHER PUBLICATIONS

D. Garlan, et al., "TransformGen: Automating The Maintenance of Structure-Oriented Environments", ACM Transactions on Programming Languages and Systems, May 1994, pp. 727-774, vol. 16, No. 3.
B.S. Lerner, "A Model for Compound Type Changes Encountered in Schema Evolution", ACM Transactions on Database Systems, pp. 83-127, vol. 25, No. 1, Mar. 2000.
A.H. Skara, "The Management of Changing Types In An Object-Orientated Database", In Proceedings of the Conference on Object-Orientated Programming Systems, Language and Applications, OOPSLA'86, Apr. 1986, pp. 483-495, ACM Press, New York.
B.S. Lerner, "A Model for Compound Type Changes Encountered in Schema Evolution", ACM Transactions on Database Systems, pp. 83-127, vol. 25, No. I, Mar. 2000.
A.H. Skara, "The Management of Changing Types In An Object-Orientated Database", In Proceedings of the Conference on Object-Orientated Programming Systems, Language and Applications, OOPSLA'86, Apr. 1986, pp. 483-495, ACM.
Simonet. "An Extension of HM(X) with Bounded Existential and Universal Data-Types" (2003) Proceedings of the 8th ACM SIGPLAN International Conferences on Functional Programming, 15 pages.
Shoshani. "A Logical-Level Approach to Data Base Conversion" (1975) Proceedings of 1975 ACM SIGMOD International Conference on Management of Data, 11 pages.
Buneman. "Inheritance and Persistence in Data Base Conversion" (1987) ACM Computing Surveys, 12 pages.
Office Action dated Oct. 2, 2007 cited in U.S. Appl. No. 11/128,893.
Office Action dated Jul. 3, 2008 cited in U.S. Appl. No. 11/128,893.
Office Action dated Mar. 6, 2009 cited in U.S. Appl. No. 11/128,893.
Office Action dated Nov. 28, 2008 cited in U.S. Appl. No. 11/094,923.
Office Action dated May 15, 2009 cited in U.S. Appl. No. 11/094,923.
Office Action dated Aug. 15, 2008 cited in U.S. Appl. No. 11/562,438.
Office Action dated Mar. 9, 2009 cited in U.S. Appl. No. 11/562,438.
Office Action dated Jul. 13, 2009 cited in U.S. Appl. No. 11/562,438.
Office Action dated Oct. 5, 2007 cited in U.S. Appl. No. 11/185,155.
Office Action dated Mar. 5, 2008 cited in U.S. Appl. No. 11/185,155.
Office Action dated Jul. 18, 2008 cited in U.S. Appl. No. 11/185,155.

* cited by examiner

DATA MODEL AND SCHEMA EVOLUTION

TECHNICAL FIELD

The subject invention relates generally to data models, and in particular to systems and methods that enable transfer of data persisted according to a data model, among other data models including future versions of the original data model.

BACKGROUND OF THE INVENTION

Increasing advances in computer technology (e.g., microprocessor speed, memory capacity, data transfer bandwidth, software functionality, and the like) have generally contributed to enhanced computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables can be arranged with rows and columns, and in many cases the data is represented differently from source to source. Ever changing data sets add to the management complexities of these databases.

In such environments, a data model plays an important role in the design of applications that interact with the database. The manner in which an application stores and retrieves data is collectively known as the application's data model. In general, the term "data model" can refer to: the abstract description how data elements are represented and/or how those elements are related to each other, and/or even the physical instantiation of those representations in bits in memory or on permanent storage.

The data model consists of several parts. The logical or abstract description of the data is known as the Schema Definition, or simply as Schema. Likewise, the set of logical behaviors provided over the data in terms of the Schema is known as the Schema API. The description of how the Schema is realized via the database system is known as the Data Model Mapping, or simply as Mapping. Additionally, the set of database primitives and their collective use in providing for the Schema API and Mapping are known as the Implementation. And, finally, the physical representation of the data in permanent or semi-permanent storage is known as the Database Layout, or just Layout. A combination of such parts is the data model, and a combination of these parts along with the data they are meant to represent is an instantiation of the data model.

Once a data model has been instantiated, it is desirable to have a flexible approach in modifying it, and to be able to change parts or all of such data model. For example, there may be a change in requirements of the application that employs the data model, and thus the data model may require modification. Moreover, implementation of new technology can allow for more efficient implementations of the existing data model or even require a new data model. Similarly, errors may become apparent in the original data model, and correction of such errors may be necessary. In the context of the invention no distinction is made between new data models that are formed by a modification of the old data model and those that are designed from scratch.

At the same time, changing the data model can also require that the data persisted according to the old model remain available under the new model. As such, generally it is necessary to produce a transformation that can be applied to the relevant data. Moreover, maintenance of the data model is typically problematic and can be further complicated by problems such as: the range of data models available (e.g., relational, object-oriented) make the description of the relationships between the new and old data models difficult; some relationships between data models are best specified explicitly while others may be more easily inferred from the definition of the data models in question; and the time it takes to apply a transformation to the data. Accordingly, a wide-range of data models have emerged over a number of years, including: relational, object-oriented and XML, each with their strengths and weaknesses. The emergence of such a wide range of data models (and their disparate implementations), in general further adds complexity to development of a generic approach to the problem of data model evolution or transformation.

For example, in a number of data models some set of transformations can be specified via a fixed set of transformation primitives. In such data models operations ranging from the simple (e.g., renaming a property/column), to the complex (e.g., changes to an object-oriented hierarchy), can occur through these defined primitives. Yet, such an approach is typically limited, in that a fixed set of primitives reduces the flexibility available to the maintainer of the data model and such primitives rarely allow transformation between radically different data models. Without a rich means of representing changes to a data model, the scope of data model evolution is therefore restricted. In still other data models, a transformation can be inferred based either on a set changes to the initial data model, or a description of the final data model and an implicit understand of the relationship between the two. Nonetheless, in such approach, the amount of information that can be inferred automatically is limited, and there exists a possibility for incorrect inferences. Moreover, combination approaches typically fail to adequately define the abilities of the transformation generation process, and the subsequent modifications that can be available.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods of evolving a data model via at least one of: an explicit definition of the Schema and Schema API describing the logical model of the original data model; an explicit description of the differences between the logical model embodied by the Schema/Schema API of the original data model versus the new data model; a set of functional transformation units providing implicit knowledge of the transformation process between data models; an explicit or implicit description of the data model mapping—implementation—layout of the original data model; and, an explicit or implicit description of the differences between the mapping, implementation, and layout of the original data model versus the new data model.

Such an arrangement can provide for a rich set of extensible transformations, which can then be automatically applied to the data, schema, schema API, implementation, and layout simultaneously. Accordingly, a core component can be built that generalizes transformations, wherein typically only parts that are unique to a transformation are provided as input to a general-purpose transformation engine, which can apply all transformations—rather than re-producing all codes associated with the transformation. Thus, the subject invention enables leveraging a common set of code for data model evolution, by defining abstractly the set of transformations across any arbitrary data model. The invention can be implemented on top of and between a wide range of data models and their implementation (e.g., relational, object oriented, combined, and the like.)

In a related aspect of the subject invention, a data model definition includes a Schema that declaratively describes the logical model, and a Schema API that embodies the methods and behaviors over the logical model and is described via the Implementation. For example, the Schema can be represented by a Type Definition Language (TDL) file, as an extensible Markup Language (XML) document that describes the available data types in the system. The Schema API can be represented as a series of methods on classes defined in a set of assemblies over the Implementation. Accordingly, a transformation can be derived for the declarative Schema and Schema API of a data model with version $V_n$, to another data model having version $V_{n+1}$, detailing the set of changes in their respective logical models. Without limiting the generality of the subject invention, and in so far that the Schema API can also be described declaratively, or its changes detailed separately, it is to be appreciated that the transformation over the Schema can be provided explicitly or derived implicitly by a tool that compares the explicit Schema description at $V_n$ and the explicit Schema description at $V_{n+1}$ and produces the transformation.

In a related aspect of the subject invention, the data model can implicitly include a Mapping that relates the Schema and the Implementation via a compiler, which when provided with a TDL file, produces the Mapping appropriate to the data model and its Implementation. Likewise, the changes in Mapping can implicitly be specified as those instantiated by a second compiler that produces, (when provided with a TDL file and the logical transformation indicated above) the Mapping appropriate to the new data model, and a transformation in the language of the Implementation that adapts existing instances of the first data model to instances of the second with the same or similar semantic meaning.

Such a second compiler can be readily understood in the context of a stable Implementation and Layout, yet conceptually no such limitation is required if the compiler implicitly specifies changes to the Implementation and Layout as well. In one exemplary aspect and as discussed below, the subject invention, suggests an instance of such strategy via employing an intermediary form that decouples the actual Implementation and Layout from the Mapping transformation described above. It is to be appreciated then, that even though no change may exist between a TDL file or the Schema API for data model $V_n$ and $V_{n+1}$, (e.g., no changes made to the logical model and the logical transformation is the empty set), nonetheless a different Mapping can result by employing the different compilers. Similarly, a different mapping can result if no changes occur to the compilers, yet a changing TDL takes place. At the same time, a set of changes can exist between a TDL file and/or the Schema API such that when used in conjunction with the different compilers produce the same Mapping.

In a related aspect of the subject invention, an Intermediary Form can be employed to decouple the actual Implementation and Layout from that referenced by either the logical transformation or the mapping transformation. The Intermediary Form, being an abstract representation of physical instantiations of logical elements and/or abstract definitions of methods or behaviors, presents a language wherein the logical and mapping transformations may be implemented. Two other transformations can then be applied, the first between the Implementation and Layout at $V_n$ toward the Intermediary Form preceding the logical and mapping transformations, and the second between the Intermediary Form toward the Implementation and Layout at $V_{n+1}$ following the logical and mapping transformations. In an environment, as is commonly the case, wherein the logical and/or mapping transformations change far more frequently than the Implementation and/or Layout, the deployment of an Intermediary Form can be advantageous. Such approach can decrease the complexity of the compilers, associated inputs, development, and/or maintenance.

Moreover, according to a further aspect of the subject invention, the set of transformations and implicit changes apparent in the compilers explained above can collectively be referred to as a Data Evolution. It is to be appreciated that each Data Evolution is self contained and its end points must always be two well defined data models. As such, any number of Data Evolutions can occur in a composable manner, and generate a series transformation sets that might adapt one data model to another while traversing any number of other data models along the way. Furthermore, an optimization can be introduced such that a series of Data Evolutions are combined together into a single Data Evolution that has the same effect as the application of each Data Evolution in the series taken in turn and applied to the output of the Data Evolution preceding it in the series.

According to yet another aspect of the subject invention, a logical or mapping transformation that employs a set of complex operations not available (or not easily implemented) in the language of the Implementation can be augmented with a set of functional transformation units that provide such operations. The functional transformation units, in general insulate the needs of a particular Data Evolution from any limitation inherent in the chosen Implementation or Intermediary Form.

In a further aspect of the subject invention, an optimization can be introduced, wherein a segment of the instantiation to be evolved can be identified, via a corresponding segment on the logical model or mapping. Accordingly, the set of transformations can typically only be applied to such segment of the instantiation, rather than performing the change through the whole instantiation, via a total transformation and still produce the same resulting data model. For instance, a change that only affects a single type or its mapping can in general only be applied to instances of that type present in the instantiation, while all other data remains untouched.

According to another aspect of the subject invention, wherein the transformation comprising a data evolution can be given in both directions (i.e., from $V_n$ to $V_{n+1}$ and from $V_{n+1}$ to $V_n$), an instantiation can be transformed such that the set of transformations that evolved the instantiation from the old to the new data model remain available. Inter-actors that employ the old version of the data model express their operations against the old data model, which are then transformed via the existing transformations and applied to the adapted instantiation. The results of the operation are similarly transformed in reverse, and returned to the actor. Likewise, an inverse scenario applies to operations expressed in the new data model, transformed, and applied to an instantiation of the old data model, and the obtained results similarly transformed in reverse. The transformations can occur in a lazy fashion and as needed, wherein the instantiation is kept on-line and a transformation is performed when an operation occurs.

In yet a further aspect of the invention, the transformations can be associated with the instantiation without actual instantiation evolution itself, so that old applications continue to connect and read data directly from the instantiation, and new applications' requests are transformed to the old data model with the result then transformed to the new data model. Accordingly, as data is transformed according to the requests of new applications, then gradual update occurs in the instantiation. Thus, a sliding scale approach can be implemented, wherein as data is transformed according to the requests of new applications, a portion of the data becomes in the new form, and gradually encompasses the entire instantiation. Thereafter, requests for the old applications/data model can be satisfied via applying the transformation, and requests for the new applications/data model by pass-through, and vice versa.

It is to be appreciated that both old and new applications can operate with a data model, wherein the data can be transformed (a number of times) as required by the application. Moreover, the scope of the transformation can be limited to a subset of the data model or a subset of types, wherein both the new version and the old version of the data is stored in the instantiation side by side, and each application can work on a respective data model.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1A:
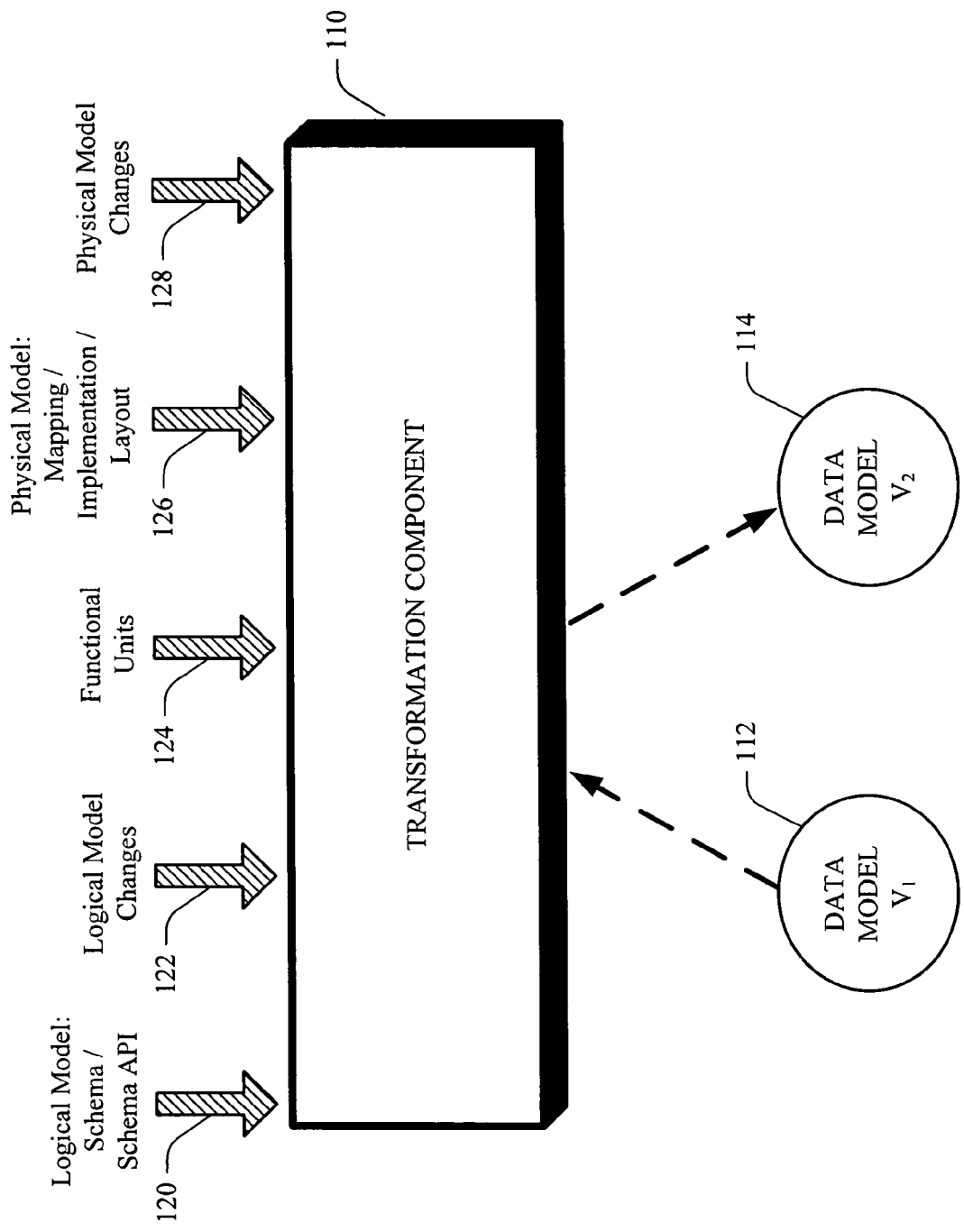
FIG. 1a illustrates a schematic block diagram of a transformation component, in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for systems and methods of evolving a data model. Referring initially to FIG. 1a, there is illustrated a schematic block of a transformation component 110, which can be applied to a data model 112 in accordance with an aspect of the subject invention. Accordingly, the transformation component 110 can be built such that it generalizes transformations, wherein typically only the parts that are unique to a transformation are provided as input to a general-purpose transformation engine that can apply all transformations—rather than re-producing all codes associated with any particular transformation. Thus, the subject invention enables leveraging a common set of codes for data model evolution, by defining abstractly the set of transformations across any arbitrary data model. The invention can be implemented on top of and between a wide range of data models and their implementations (e.g., relational, object oriented, combined, and the like.)

As illustrated, the transformation component 110 can typically take five inputs, namely:

1. An explicit definition 120 of the Schema and Schema API describing the logical model of the original data model;
2. An explicit description 122 of the differences between the logical model embodied by the Schema/Schema API of the original data model versus the new data model;

3. A set of functional transformation units 124 providing implicit knowledge of the transformation process between data models;
4. An explicit or implicit description 126 of the data model mapping, implementation, and layout of the original data model; and,
5. An explicit or implicit description 128 of the differences between the mapping, implementation, and layout of the original data model versus the new data model.

Figure 1B:
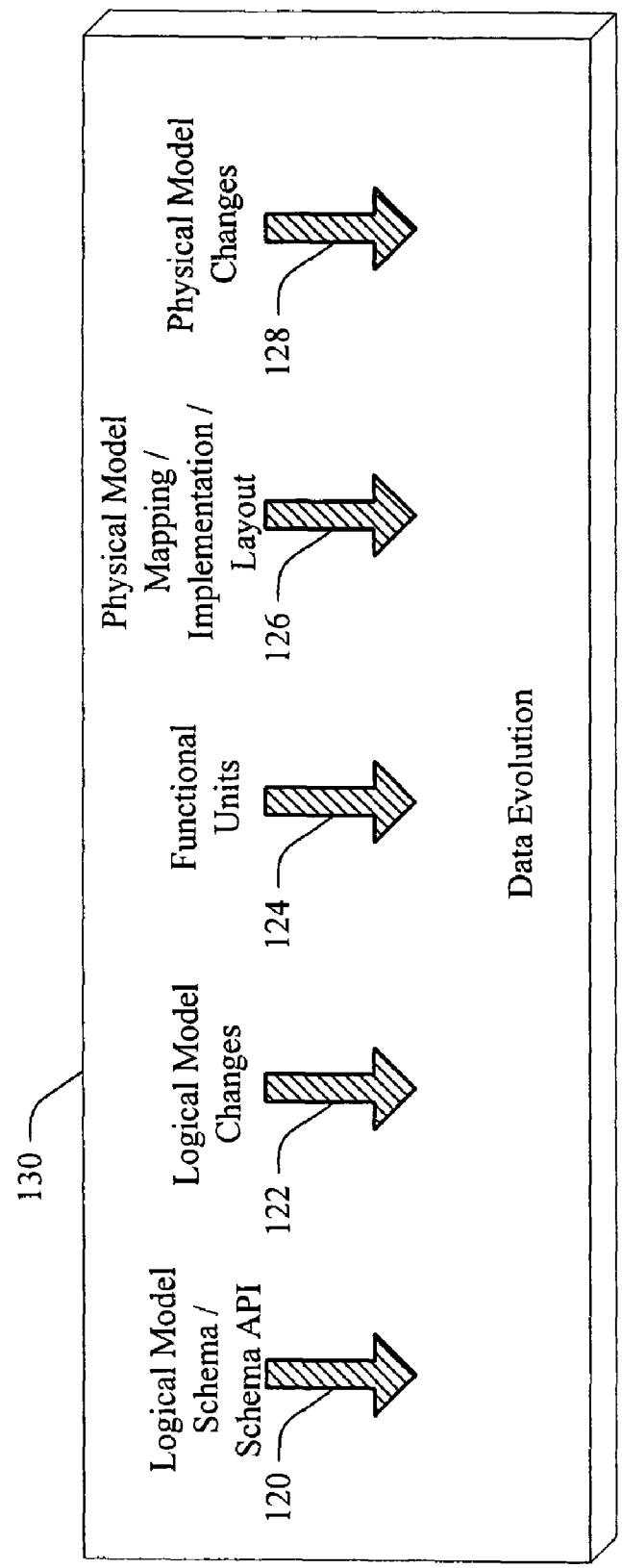
FIG. 1b illustrates a schematic block diagram of a data evolution component according to an exemplary aspect of the subject invention.
Figure 1C:
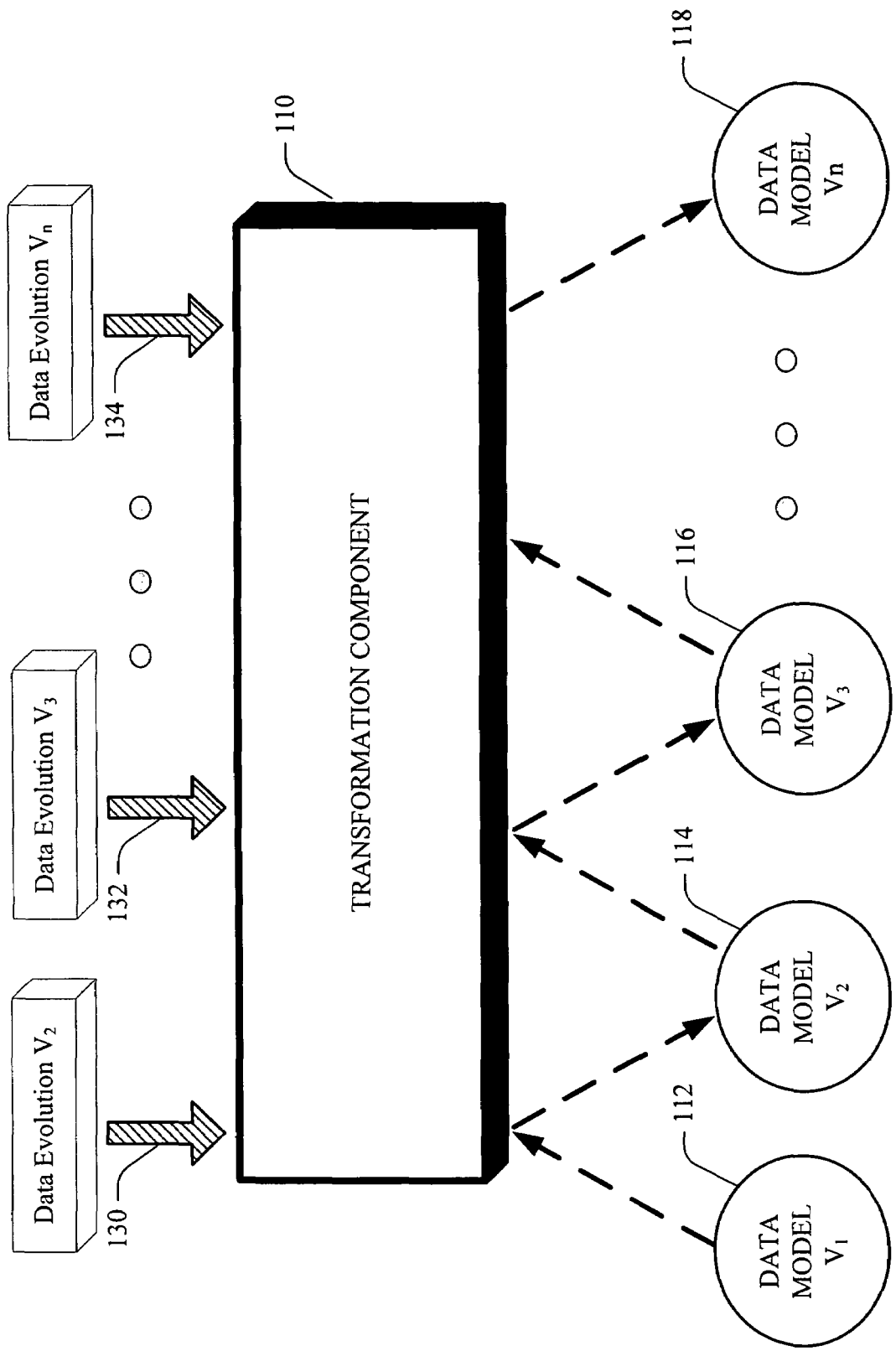
FIG. 1c illustrates a schematic block diagram of the composition of data evolutions according to a particular aspect of the subject invention.

The transformation component 110 can combine operations that are defined declaratively (e.g., adding a column to a table, a property to a type, and the like), operations that are defined implicitly (e.g., dropping a table, changing the type of a property, and the like) and operations that are defined functionally (e.g., splitting a property according to a particular pattern, and the like), to evolve the data model 112 to the data model 114. As illustrated in FIG. 1*b*, the set of inputs to the transformation engine can collectively be referred to as a Data Evolution 130. A Data Evolution in general need not necessarily contain all such inputs, as some may be unnecessary in the transformation from some data model 112 to some other data model 114. It is to be appreciated that each Data Evolution is self contained and its end points must typically always be two well defined data models. The Data Evolution is but a set of inputs to the transformation component 110 and the subsequent data model 114 is the result of the application of that component 110 on the initial data model 112. As such, any number of Data Evolutions can occur in a composable manner, and generate a series of transformation sets that can adapt one data model to another while traversing any number of other data models along the way, by repeated application of the transformation component 110 to the resulting data models with the appropriate Data Evolutions as inputs. This is depicted in FIG. 1*c* where the Data Evolutions 130, 132, through 134 are provided as inputs to the transformation component 110, and are in turn applied to data models 112 to produce 114, then 116, and so on to 118. Furthermore, an optimization can be introduced such that a series of Data Evolutions are combined together into a single Data Evolution that has the same effect as the application of each Data Evolution in the series taken in turn and applied to the output of the Data Evolution preceding it in the series.

Each data model (e.g. 112, 114, 116 through 118) includes the definition of a Schema and a Schema API. The Schema, being the logical or abstract description of the data, and the Schema API, being the set of logical behaviors provided over the data in terms of the Schema, taken together provide a definition of the Logical Model over which an application interacts with the data. Logical Models can be expressed and represented in a large number of ways (e.g., relational, object-oriented, XML, and the like), and it is to be appreciated that even though the following discussion primarily focuses on Logical Models that are described by a set of types that collectively form a type hierarchy; the subject invention is not so limited. The subject invention can be applied to any such form, the remainder of this document will focus, without limiting the generality of the subject invention, on Logical Models described by a set of types that collectively form a type hierarchy. Such type constructs can be used to constrain the meaning, usage, and relationships of data elements. Typically, a type can be utilized to define virtually any data value including logical, binary, octal, decimal, hexadecimal, integer, floating-point, character, character string, user-defined data types, and combinations of these data values used to defined data structures. Furthermore, such Logical Models are often extensible through the introduction of new types which extend at least one existing type. It is to be appreciated that introduction of new types in itself may or may not constitute a change in the data model in the context of the subject invention, and a change in the data model could entail the addition of new types.

The structure of types, in such a Logical Model as indicated above, can typically be described by an XML document wherein the elements and attributes so arranged detail the types and their respective properties and other intrinsic characteristics declaratively. The data to be contained within such types can include numbers, literal strings, variables, references, and other suitable data without limitation. Such an XML dialect intended for the description of types might be called Type Definition Language (TDL). Furthermore, TDL can typically allow for the declaration of types that contain other types through nesting, containment, embedding or the like. Such nested or contained types might appear as properties on the containing types, as addressable elements in a collection, or through many other means. Still further, TDL can typically allow for the declaration of types that inherit, extend, implement, or are similarly related to another type either inherent in the type system or also described similarly in TDL. Thus, types form a type hierarchy in the shape of a well-connected graph which can typically be represented as a tree. It should be appreciated that the subject invention is intended to function with all types such as those described herein and others described with any of various other methods.

As the Schema can be described in many ways including TDL, so the Schema API can similarly be described variously. In one such case, the Schema API could be described functionally through the utilization of an object-oriented programming language. Such a language would provide an object construct to represent each type described by the TDL, as well as such associations necessary to represent the relationships between types including, but not limited to, nesting, containment, embedding, inheritance, extension, implementation, and the like. Typically, objects can be packages of data within single units or items, and can be associated with identities that are separate from identities of other objects. Such constructs can relate the properties of the objects, as class definitions and object-dependency indicia.

Structure and behavior of objects are defined by a class, which is a definition of all objects of a specified type. Objects are explicitly created as a function of a class, and an object so created is considered to be an instance of such class. Objects can further be associated with method pointers, member access control, implicit data members utilized to locate instances of a class in a type hierarchy, and the like. Moreover, an object's data and/or functionality can be based on data and/or functionality of disparate objects(s), from which the former object inherits. Inheritance enables commonalities amongst differing types of objects to be expressed a single time and thereafter utilized multiple times in multiple contexts. The methods associated with objects, taken collectively, and ultimately expressed in the language of the Implementation of the data model, describe explicitly or implicitly the Schema API, or the set of logical behaviors over the data.

Figure 2:
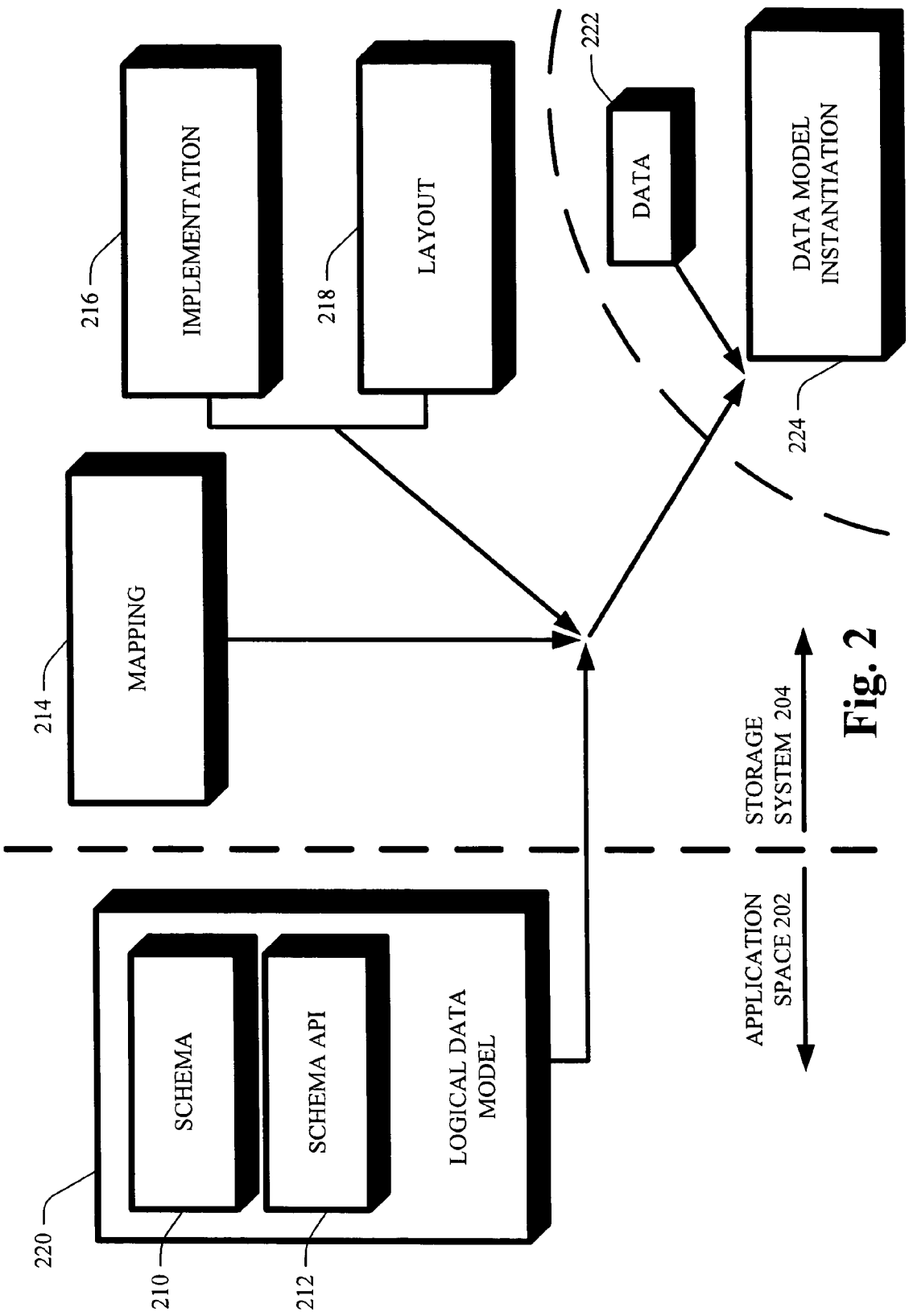
FIG. 2 illustrates a block diagram for instantiation of a data model, as part of a data model evolution according to an exemplary aspect of the invention.

FIG. 2 illustrates a block diagram for instantiation of a data model. The Logical Model 220 described above contributes the Schema 210 and the Schema API 212. The Logical Model is the public surface area of the data model to applications and thus appears in the Application Space 202 of the data model. The Storage System 204 is composed of three Physical Model components, Mapping 214, Implementation 216, and Layout 218. The Mapping 214 can detail how the Schema 210 is realized in the storage system and guides the execution of the Schema API 212 in the language of the Implementation 216.

The Implementation 216 is collectively the set of primitives for storage and manipulation provided by the storage system. The data bound structures of this set of primitives are the toolset for describing the Mapping 214. Similarly, the operative elements of this set of primitives are typically exposed through a declarative or functional language (e.g., SQL, Objective-C++, and the like) and are used to execute the Schema API 212. Moreover, the Layout 218 details the physical representation in permanent or semi-permanent storage of all data bound structures exposed through the Implementation. The combination of all of these elements forming the data model.

The data model can be implemented as part of a database, file system, or any other storage system that enables storing, finding, and relating information. Typical information types that could be stored in the system can include a document, an image, music, video, a contact, a message, and the like. Such information types can be represented as instances of the Schema types described above. The storage system 204 can store the type instances and provide query capabilities to find such items, documents, contacts or the like that satisfy certain criteria. The combination of the data model and the Data 222, encoding information types as described above, form a Data Model Instantiation 224. In the context of the subject invention, an instantiation of one data model can be transformed into an instantiation of another data model by transforming both the original data model to the new data model, and simultaneously transforming the data, e.g., all of its type instances, from its original layout to the new layout.

The following examines a particular case wherein the schema is given as a TDL. It is also possible that a Schema described as TDL be associated with the Schema API and the Mapping through a compiler. Such a compiler takes TDL as input, combines those type definitions with the Schema API and produces a Mapping appropriate to the Implementation and Layout in question. The details of how the Schema and the Mapping relate are built into the compiler such that many Mappings may be rapidly generated for several Schema that follow similar patterns. Changes to the Mapping are affected through alterations in the compiler, while changes in the Schema are made to the TDL, and the Schema API is modified directly. A compiler can be advantageous when the Implementation and Layout change very slowly, the Mapping slowly (yet more frequently), and the Schema and Schema API change most frequently. It is to be appreciated that such a compiler is not a required element of the subject invention, and each component described herein can be authored independently to the same or similar effect. For illustrative purposes the discussion herein assumes existence of such a compiler and that the Schema, Schema API, and Mapping are related in just such a manner.

Figure 3:
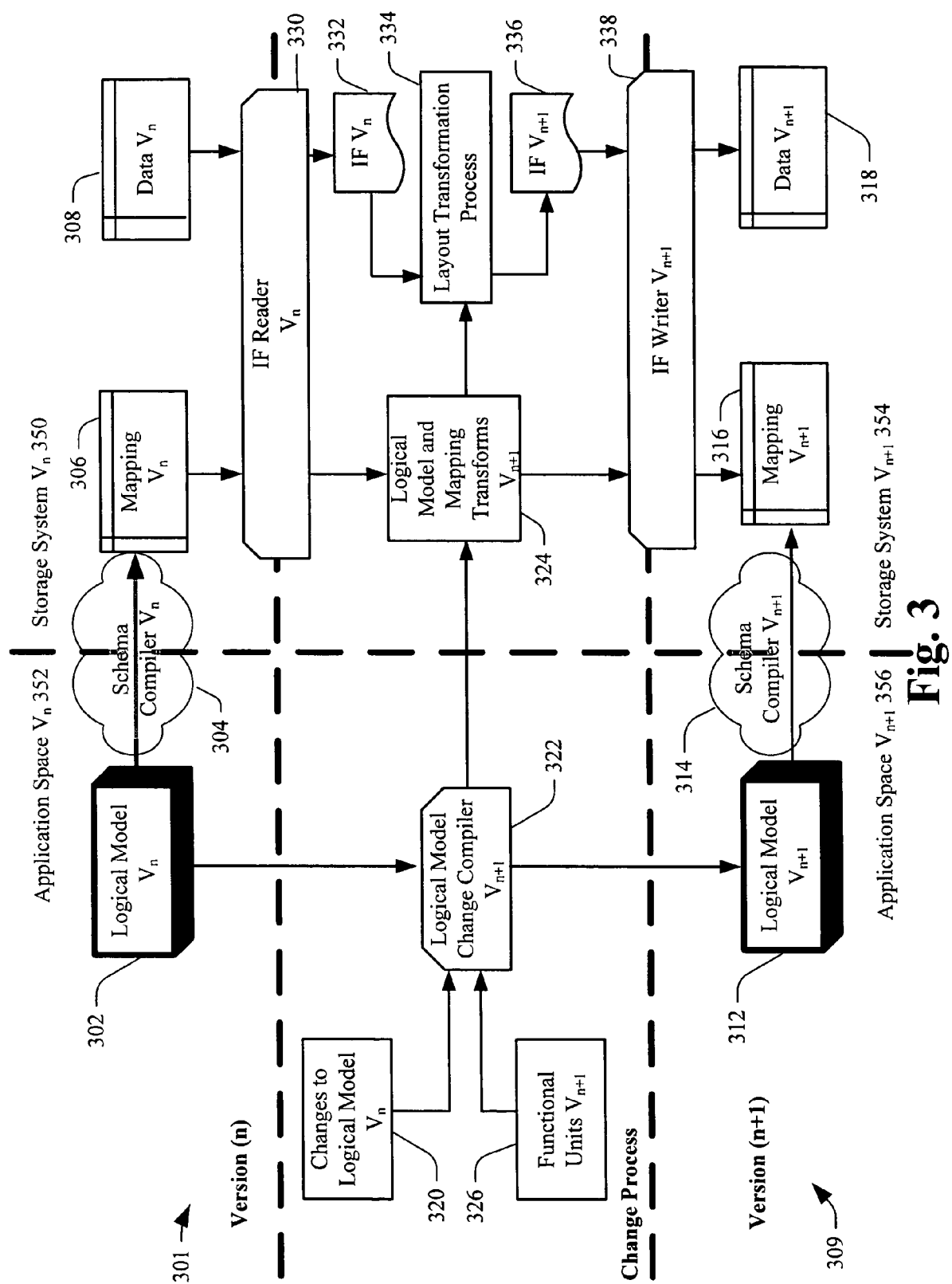
FIG. 3 illustrates stages for transformation from a data model instantiation $V_n$ to a data model instantiation $V_{n+1}$, according to a particular aspect of the invention.

FIG. 3 illustrates a block diagram for transformation of a data model instantiation according to a particular aspect of the invention. The Logical Model $V_n$ 302, including the Schema and Schema API descriptions for the data model $V_n$, is passed to a Schema Compiler $V_n$ 304, such as described in detail above. The Schema Compiler might, for example, take a TDL document describing the Schema and a group of functional specifications in the language of the Implementation, e.g. SQL, C#, Java, C++, and the like, files describing methods of classes associated with the Schema, and produce a Mapping $V_n$ 306, e.g. a TSQL Schema and a set of managed assemblies implementing the Schema API as classes. The Mapping $V_n$ 306 is then used, in conjunction with the Implementation and Layout in the Storage System $V_n$ 350, (e.g. a relational database with managed extensions), to create and persist data instances over $V_n$ 308, e.g. serialized classes stored in rows in a relational table within the database. These pieces collectively represent a data model instantiation $V_n$ including all five constituent parts, as described above, of the data model $V_n$, plus data instances over $V_n$.

Similarly, the Logical Model $V_{n+1}$ 312, including the Schema and Schema API descriptions for the data model $V_{n+1}$, is passed to a second Schema Compiler $V_{n+1}$ 314, which creates a second Mapping $V_{n+1}$ 316, which in conjunction with a second Implementation and Layout in the Storage System $V_{n+1}$ 354, is used to create and persist data instances over $V_{n+1}$ 318.

According to one aspect of the subject invention, a set of transformations exist such that the data model instantiation $V_n$ 301 can be transformed into the data model instantiation $V_{n+1}$ 309. The components 320 through 340 depict such a transformation and the process by which that transformation can be applied between the two data models. It is to be appreciated that the process described herein exemplifies one particular execution according to an aspect of the subject invention. The components 300 through 350 can correspond to the Transformation Component 110 described in FIG. 1*a* and its inputs 120 through 128 of the same figure.

As illustrated in FIG. 3, the component Changes to the Logical Model $V_n$ 320 depicts those changes both to the Schema and the Schema API, also depicted as 120 of FIGS. 1*a*, 1*b*. These changes, in the example execution given in FIG. 3, are passed as input to a Logical Model Change Compiler 322. The second input, Functional Units $V_{n+1}$, also depicted as 124 of FIGS. 1*a*, 1*b* is also passed to the Change Compiler. The Change Compiler interprets the changes and produces two outputs: the Logical Model $V_{n+1}$ 312, and the Logical Model and Mapping Transforms $V_{n+1}$ 324. The Logical Model $V_{n+1}$ 312 produced by the Change Compiler is exactly the same logical model description authored independently as part of data model $V_{n+1}$. As such, the Logical Model $V_{n+1}$ 312 may optionally not be independently authored at all, but be produced solely by the Change Compiler in response to processing the Changes to Logical Model $V_n$ 320.

The Logical Model and Mapping Transforms $V_{n+1}$ 324 are written in the language of the Implementation $V_{n+1}$, and perform two functions. First, they transform the Mapping $V_n$ 306 to the Mapping $V_{n+1}$ 316 as depicted in the downward arrows connecting 306 to 316 through 324 (wherein 330, 338 can be circumvented in this particular example, and are discussed infra). Second, they provide sufficient information to the Layout Transformation Process 334 to transform the data instances $V_n$ 308 to the data instances $V_{n+1}$ 318. The knowledge necessary to transform Mapping $V_n$ 306 to Mapping $V_{n+1}$ 316 is implicit in the Change Compiler, much as the knowledge of Mapping generation is implicit in the Schema Compiler $V_{n+1}$ 314. As Mapping $V_{n+1}$ is developed, changes to the Schema Compiler $V_{n+1}$ 314 are affected, and similarly changes are affected to the Change Compiler $V_{n+1}$ 322. Accordingly, an optimization exists such that the Schema Compiler $V_{n+1}$ 314 and the Change Compiler $V_{n+1}$ 322 are combined into a single compiler. It is to be appreciated that the subject invention is not so limited. To the extent that the language of the Implementation $V_{n+1}$ does not have sufficient expressibility to accomplish the transformation between Mappings, the Functional Units $V_{n+1}$ 326 may provide additional functionality leveraged by the Mapping transforms.

The Logical Model and Mapping Transforms $V_{n+1}$ 324 are able to provide sufficient information to the Layout Transformation Process 334 by combining the structural information explicitly declared by the Schema given as part of the Logical Model $V_n$ 302, the Changes to the Logical Model $V_n$ 320, and the implicit knowledge of how the Logical Model $V_{n+1}$ 312 is realized via the Mapping $V_{n+1}$ 316, and the implicit knowledge of how the relationship between the Logical Model and the Mapping has changed between $V_n$ and $V_{n+1}$. The Layout Transformation Process 334 is then responsible for transforming, collectively, all the data instances $V_n$ 308 into data instances $V_{n+1}$ 318 as depicted by the downward connecting 308 to 318 through 334 (wherein 330, 332, 336, and 338 can be circumvented in this particular example, and are discussed infra). To the extent that the language of the Implementation $V_{n+1}$ does not have sufficient expressibility to accomplish the transformation between data instances, the Functional Units $V_{n+1}$ 326 can provide additional functionality leveraged by the layout transforms. While such functionality is written explicitly by the data model author its knowledge is provided implicitly to the process.

Having thus generated the Logical Model $V_{n+1}$ 312 from the Change Compiler, or otherwise by hand; generated the Mapping $V_{n+1}$ 316 from the Logical Model and Mapping Transforms $V_{n+1}$ 324, or otherwise by hand; swapped the Storage System $V_n$ 350 for Storage System $V_{n+1}$ 354 with its Implementation and Layout for $V_{n+1}$; and transformed all existing data instances $V_n$ 308 via the Layout Transformation Process 334 to data instances $V_{n+1}$ 318; the transformation of the instantiation of data model $V_n$ 301 to an instantiation of data model $V_{n+1}$ 309 has been completed.

In a related aspect of the invention, and because it poses challenges to express either the Mapping transforms or the layout transforms in the language of the Implementation $V_{n+1}$, or to decouple the Change Compiler from the actual Storage System, or to affect changes between vastly differing Storage Systems, or for any number of other reasons, it can be advantageous to introduce an Intermediary Form (IF) over which the set of transforms operate, rather than operating directly over the language of the Implementation $V_{n+1}$. As such, an Intermediary Form with at least as much expressibility as the language of the Implementation $V_n$, the Layout $V_n$, the language of the Implementation $V_{n+1}$, and the Layout $V_{n+1}$, must be chosen. For example, Extensible Markup Language (XML) provides a highly generic and very expressible form over which virtual any transformation can be coded. FIG. 3 illustrates the use of an Intermediary Form in the components 330, 332, 336, and 338. If such an Intermediary Form is to be employed, a transformation, IF Reader $V_n$ 330, converting the Mapping $V_n$ 306, and the Layout $V_n$ of the Storage System $V_n$ 350 toward the Intermediary Form must typically be provided. Similarly, a transformation, IF Writer $V_{n+1}$ 338, converting the Intermediary Form toward Mapping $V_{n+1}$ 316, and the Layout $V_{n+1}$ of the Storage System $V^{n+1}$ 354 must in general be provided. Accordingly, the Logical Model and Mapping Transforms $V_{n+1}$ 324 can be written in the language of the Intermediary Form instead of the language of the Implementation $V_{n+1}$, as can the Functional Units $V_{n+1}$ 326. The Mapping $V_n$ can then be converted to the IF via the IF Reader $V_n$ 330 before being transformed, and subsequently converted to the Mapping $V_{n+1}$ 316 after being transformed. Similarly, the data instances $V_n$ 308 are converted to the data IF $V_n$ 332 before the layout transforms are applied, with the result being the data IF $V_{n+1}$ 336 which is then converted to data instances $V_{n+1}$ 318 to complete the process. As an example, if the Intermediary Form is XML, the Logical Model and Mapping Transforms $V_{n+1}$ 324 can be given as an Extensible Stylesheet Language Transformation (XSLT) document, or an XQuery document, where the Functional Units $V_{n+1}$ 326 being additional templates, XPath extension functions, XQuery methods, or the like. It should be appreciated that the use of an Intermediary Form, however, is simply a special case of advanced functionality provided through the Functional Units $V_{+1}$ 326.

Moreover, it is to be appreciated that the amount of data to be transformed can vary and range from an individual item stored in a row, through to a complete row, or to a table or an entire database, and the like. In general, a key benefit of such intervention according to the subject invention is a flexibility introduced during application of the change process, and also designation of the data set to which transformation can be applied. It is to be appreciated that the invention can be applied to a wide range of underlying data models and to a subset of those models.

Figure 4:
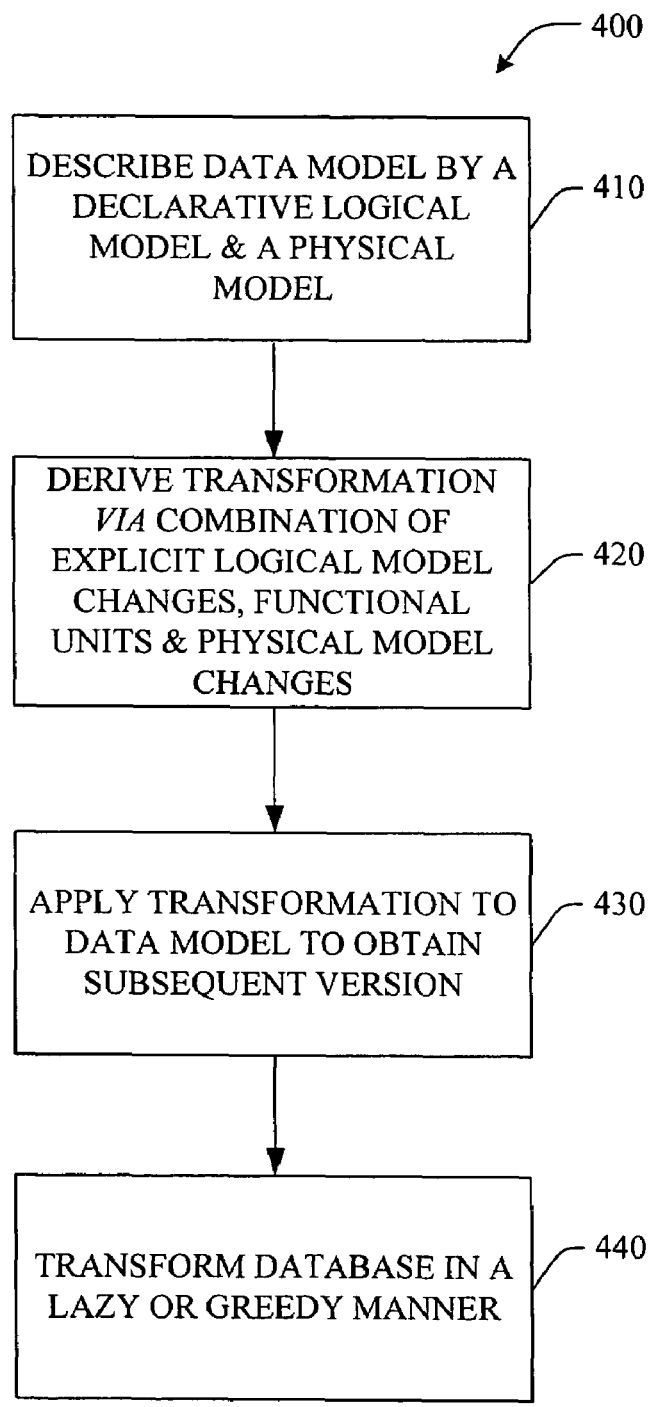
FIG. 4 illustrates a flowchart of evolving a data model, in accordance with an aspect of the subject invention.

FIG. 4 illustrates a flow chart 400 of data evolution in accordance with an aspect of the subject invention. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially at 410 a data model can be described by a declarative logical model of Schema and Schema API, and a physical model that expresses the Mapping, Implementation and Layout of the data model. Next, and at 420 a transformation can be derived via a combination of explicit logical model changes, Functional Units, and physical model changes, as explained in detail supra. Thus, the transformation can take five inputs, namely the logical model, logical model changes, Functional Units, physical model and physical model changes. As such, transformation according to the invention can enable the common operations that are defined declaratively (e.g., adding a column to a table, a property to a type, and the like), to be combined with uncommon operations that are defined functionally (e.g., splitting a property according to a particular pattern, and the like), to derive a transformations from an old data model to a new data model.

Subsequently and at 430, such transformation can be applied to the data model to obtain a new version thereof. The transformation can then be implemented in the database in a lazy (e.g., object-by-object) or greedy (e.g., all-at-once) manner at 440. In a further aspect of the subject invention, an optimization can be introduced (not shown), wherein a segment of the instantiation to be changed can be identified, via a corresponding segment on the logical model. Accordingly, transformation can typically only be applied to such segment of the instantiation, rather than performing the change through the whole instantiation, via a total transformation.

Figure 5:
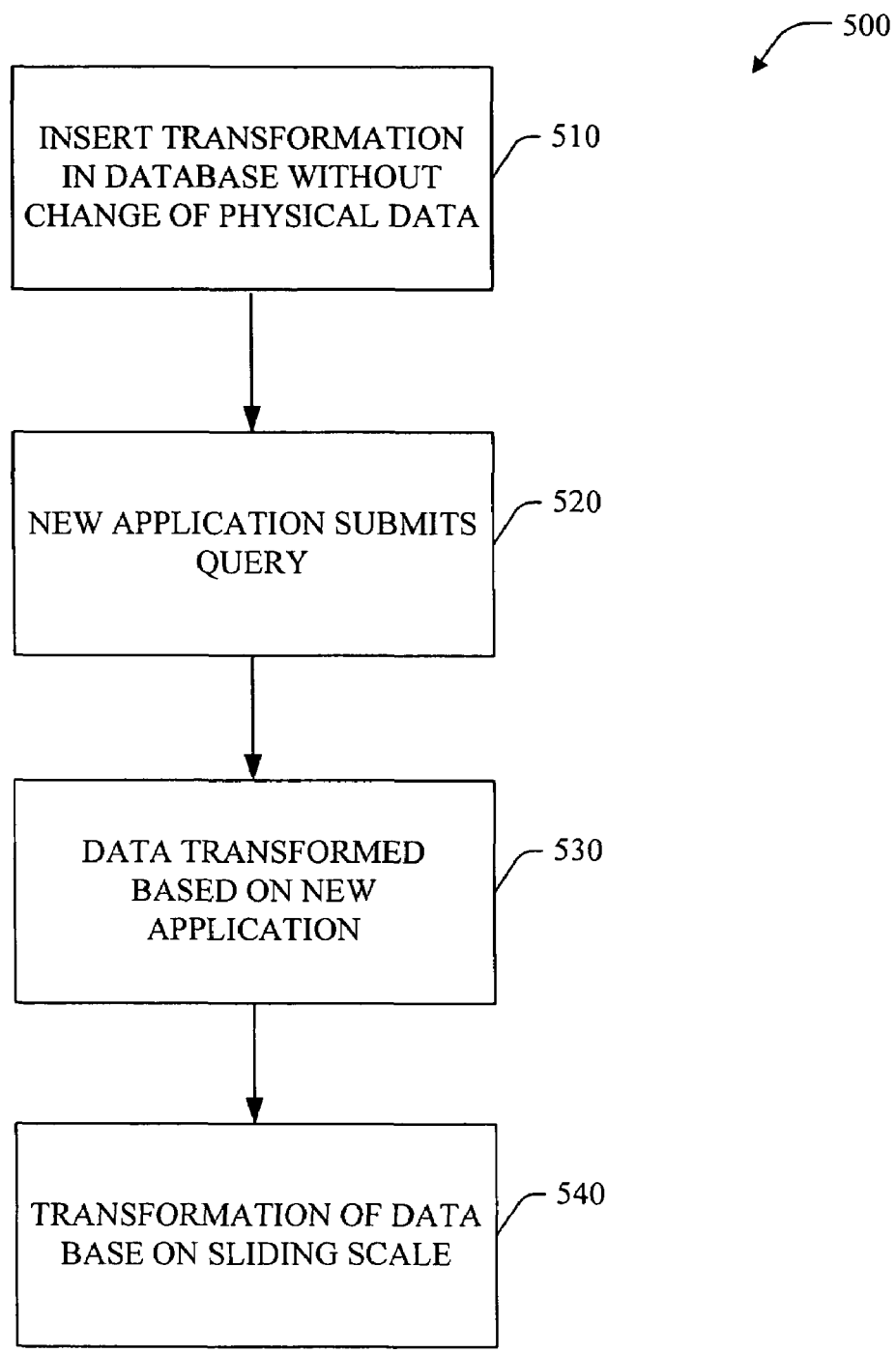
FIG. 5 illustrates a methodology for updating a database from an old model to a new model according to a particular aspect of the invention.

Referring now to FIG. 5 a methodology 500 of updating a database based on an evolving data model in accordance with an aspect of the subject invention is illustrated. Initially, and at 510, the transformations of the subject invention can be inserted into the database without a change to the physical database itself, so that old applications continue to connect and read data directly from the database, and for new applications the requests are transformed to the old data model with the result transformed. At 520 an application that employs the new data model (new application) submits a query to the database. Accordingly, as data is transformed according the requests of new applications, then gradual update occurs in the database at 530. Thus, a sliding scale approach can be implemented, wherein as data is transformed according to the requests of new applications, wherein a portion of the data becomes in the new form, to gradually encompass the entire database at 540. Thereafter, requests for the old applications/data model can be satisfied via applying the transformation, and requests for the new applications/data model by pass through, and vice versa. It is to be appreciated that both old and new applications can operate with a data model, wherein the data can be transformed (a number of times) as required by the application. Moreover, the scope of the transformation can be limited to a subset of the data model or a subset of types, wherein both new version and the old version of the data is stored in the databases side by side, and each application can work on a respective data model.

Figure 6:
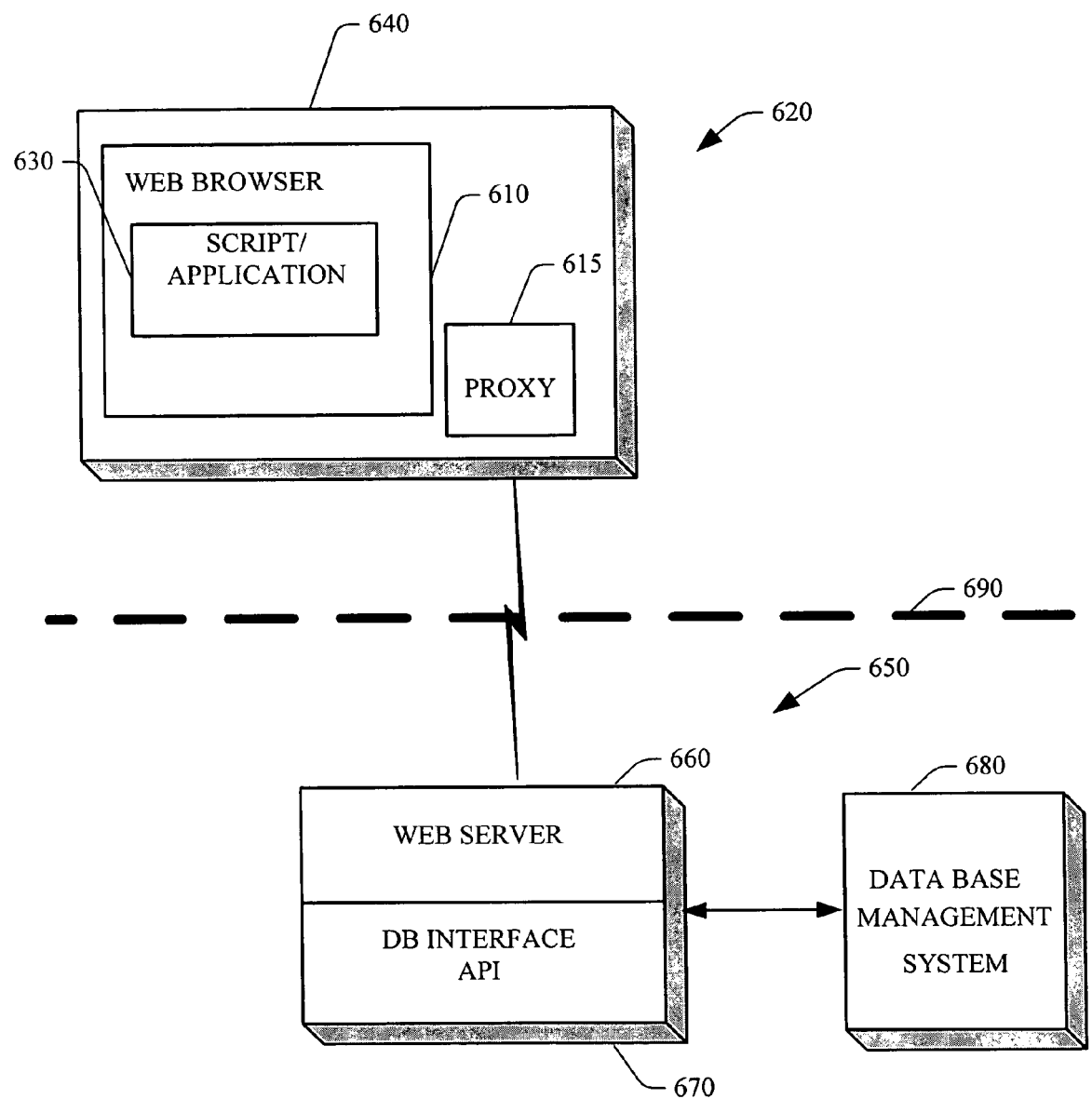
FIG. 6 illustrates a related aspect of the invention, wherein a client submits a query to a server that can employ evolving data models.

FIG. 6 illustrates a related aspect of the invention, wherein a client submits a query to a server that can employ evolving data models. Running on the client 620 is a client process, for example, a web browser 610 and, running on the server 650 is a corresponding server process, for example, a web server 660. In addition, embedded in the Web Browser 610 can be a script or application 630, and running within the run-time environment 640 of the client computer 620, can exist a proxy 615 for packaging and unpacking data packets formatted in accordance with various aspects of the invention. Communicating with the server 650 is a database management system (DBMS) 680, which manages access to a database (not shown). The DBMS 680 and the database (not shown) can be located in the server itself, or can be located remotely on a remote database server (not shown). Running on the Web server 660 is a database interface Applications Programming Interface (API) 670, which provides access to the DBMS 680. The client computer 620 and the server computer 650 can communicate with each other through a network 690. When the client process, e.g., the Web browser 610, requests data from a database, the script or application 630 issues a query, which is sent across the network (e.g. internet) 690 to the server computer 650, where it is interpreted by the server process, e.g., the Web server 660. The client's 620 request to server 650 can contain multiple commands, and a response from server 650 can return a plurality of result sets.

Figure 7:
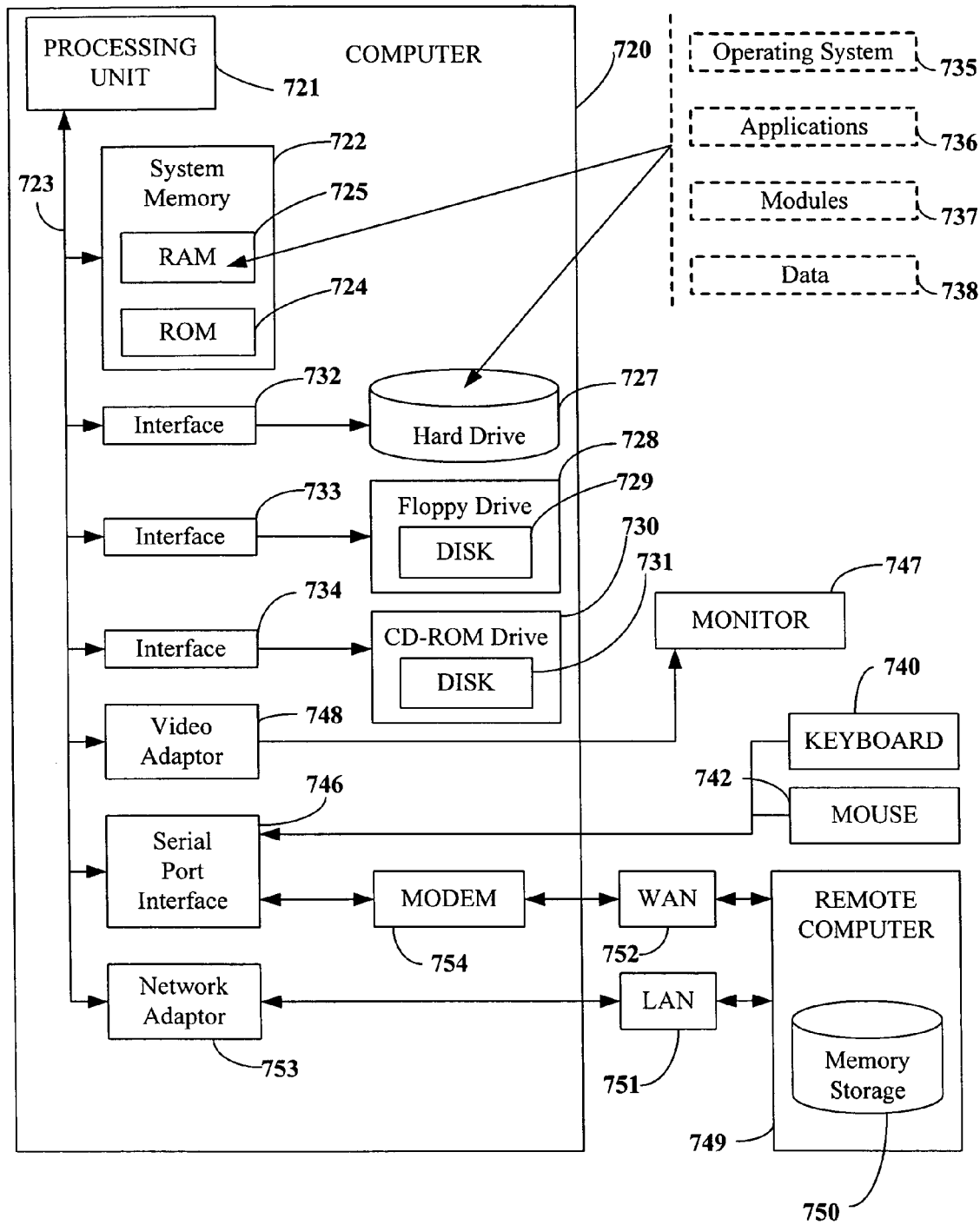
FIG. 7 illustrates a brief, general description of a suitable computing wherein the various aspects of the subject invention can be implemented.

Referring now to FIG. 7, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 720, including a processing unit 721, a system memory 722, and a system bus 723 that couples various system components including the system memory to the processing unit 721. The processing unit 721 can be any of various commercially available processors. Dual microprocessors and other multi-processor architectures also can be used as the processing unit 721.

The system bus can be any of several types of bus structure including a USB, 1394, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 725, including an operating system 735, one or more application programs 736, other program modules 737, and program data 738. The operating system 735 in the illustrated computer can be substantially any commercially available operating system.

A user can enter commands and information into the computer 720 through a keyboard 740 and a pointing device, such as a mouse 742. Other input devices (not shown) can include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 can operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 7. The logical connections depicted in FIG. 7 may include a local area network (LAN) 751 and a wide area network (WAN) 752. Such networking environments are commonplace in offices, enterprise-wide computer networks, Intranets and the Internet.

When employed in a LAN networking environment, the computer 720 can be connected to the local network 751 through a network interface or adapter 753. When utilized in a WAN networking environment, the computer 720 generally can include a modem 754, and/or is connected to a communications server on the LAN, and/or has other means for establishing communications over the wide area network 752, such as the Internet. The modem 754, which can be internal or external, can be connected to the system bus 723 via the serial port interface 746. In a networked environment, program modules depicted relative to the computer 720, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

Figure 8:
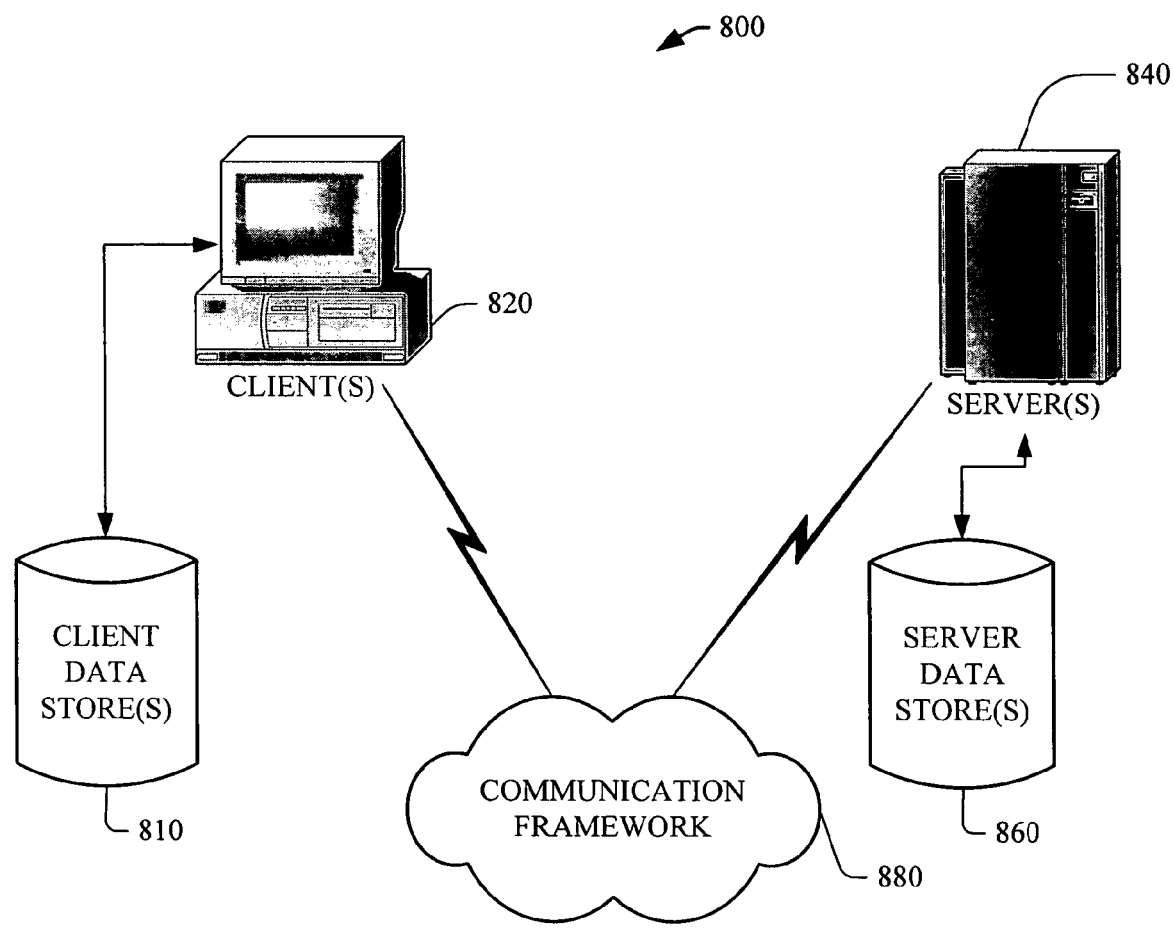
FIG. 8 illustrates a client—server system that can employ a data evolution according to one aspect of the invention.

Referring now to FIG. 8, a client—server system 800 that can employ data evolving model according to one aspect of the present invention is illustrated. The client(s) 820 can be hardware and/or software (e.g., threads, processes, computing devices). The system 800 also includes one or more server(s) 840. The server(s) 840 can also be hardware and/or software (e.g., threads, processes, computing devices). For example, such servers 840 can house threads to perform transformations by employing the present invention. The client 820 and the server 840 can communicate, in the form of data packets transmitted according to the present invention, between two or more computer processes. As illustrated, the system 800 includes a communication framework 880 that can facilitate communications between the client(s) 820 and the server(s) 840. The client(s) 820 is operationally connected to one or more client data store(s) 810 that can store information local to the client(s) 820. Moreover, client 820 can access and update databases 860 located on a server computer 840 running a server process. In one aspect of the present invention, the communication frame work 880 can be the internet, with the client process being a Web browser and the server process being a Web server. As such, a typical client 820 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 840 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates evolution of a data model comprising:
   a processor;
   system memory;
   a data model with a Schema that declaratively describes a logical model associates therewith, a Schema API that embodies methods and behaviors over the logical model, and a physical model of a Mapping, an Implementation and a Layout;
   a transformation component that derives a transformation for th e data model, wherein the transformation component is configured to generalize transformations such that only those parts that are unique to a given transformation are to be provided as inputs for that transformation, the transformation component being configured to leverage a common set of codes for data model evolution by abstractly defining the set of transformations across any arbitrary data model, the data models including at least one of a relational model, and object orientated model and an XML data model, such that when the transformation is applied to a version $V_n$ of a data model, the version is evolved into data model version $V_{n+1}$, wherein data model version $V_{n+1}$ subsumes data model version $V_n$;
   the transformation component further evolves at least one instantiation of the data model including instantiation mapping evolution, instantiation data evolution, or combinations thereof, such that an instantiation $V_{n+1}$ will subsume an instantiation $V_n$, wherein the transformation component is further configured to combine operations that are defined declaratively, operations that are defined implicitly, and operations that are defined functionally to evolve that data model according to the variously defined operations;
   wherein application access to any instantiation of the data model associated with an evolution can include further transient transformation of an instant version of an instantiation to an appropriate version to facilitate application access across the data model and instantiation evolution.

2. The system of claim 1, the data model implicitly includes a mapping that relates the logical model and an implementation via a compiler.

3. The system of claim 1, the Schema represented by a Type Definition Language (TDL).

4. The system of claim 1, an explicit data model definition represented by a Type Definition Language (TDL) file.

5. The system of claim 1, the Schema API represented by a code in a programming language.

6. The system of claim 2, changes in the mapping being implicitly specified by implementation of the compiler.

7. The system of claim 5, the programming language is one of an SQL, C#, Java, C++.

8. A method of evolving a data model comprising: employing at least one of:
   an explicit definition of a Schema and Schema API that describes a logical model of an original data model;
   an explicit description of differences between the logical model embodied by the Schema or Schema API of the original data model versus a new data model;
   a set of functional transformation units providing implicit knowledge of transformation process between the original data model and the new data model, the transformational units being configured to generalize transformations such that only those parts that are unique to a given transformation are to be provided as inputs for that transformation, the transformation units being configured to leverage a common set of codes for data model evolution by abstractly defining the set of transformations across any arbitrary data model, the data models including at least one of a relational model, an object oriented model and an XML data model;
   an explicit or implicit description of an associated data model mapping, implementation, and layout of the original data model;
   an explicit or implicit description of differences between the associated mapping, implementation, and layout of the original data model versus the new data model;
   transforming the original data model to the new data model, such that the new data model evolves and replaces the original data model, such that the new data model subsumes the old data model, based on the employing act, wherein the transformation units are further configured to combine operations that are defined declaratively, operations that are defined implicitly, and operations that are defined functionally to evolve the data model according to the variously defined operations; and
   transforming at least one instantiation of the data model, including instantiation mapping evolution, instantiation data evolution, or combinations thereof, such that a new instantiation subsumes an older instantiation and wherein applications accessing an instantiation of the data model associated with an evolution can include further transient transformation of an instant version of an instantiation to an appropriate version to facilitate application access across the data model and instantiation evolution.

9. The method of claim 8 further comprising availing to inter-actors a set of composable transformations that evolved an instantiation from the original data model to the new data model.

10. The method of claim 8 further comprising reversing a transformation from the new data model to the original data model, such that the original data model replaces the new data model.

11. The method of claim 8 further comprising associating a transformation with a Data Model Instantiation without actual instantiation evolution.

12. The method of claim 8 further employing an Intermediate Form to decouple an actual Implementation and Layout from a transformation.

13. The method of claim 8 further comprising combining a series of Data Evolutions into a single Data Evolution.

14. The method of claim 8 further comprising gradually updating an instantiation.

15. The method of claim 11 further comprising performing the transforming act in a greedily or lazily manner.

16. The method of claim 12 further comprising employing the Intermediate Form to ease expression of the transformation.

17. The method of claim 12 further comprising converting the transformation to an Extensible Style Language Transformation (XSLT) document.

18. The method of claim 12 further comprising reading data directly from an instantiation by old applications.

19. The method of claim 12 further comprising transforming requests of new applications to original data model.

20. A system that facilitates evolution of a data model in a database comprising:
   a processor;
   system memory;
   means for expressing a data model instantiation;
   means for transforming the data model instantiation from one version to another version, wherein the transforming means is configured to generalize transformations such that only those parts that are unique to a given transformation are to be provided as inputs for that transformation, the transforming means being configured to leverage a common set of codes for data model evolution by abstractly defining the set of transformations across any arbitrary data model, the data models including at least one of a relational model, an object oriented model and an XML data model, such that the transformed data model instantiation evolves and replaces the original data model instantiation, such that the new data model instantiation subsumes the earlier data model instantiation, wherein the transforming means is further configured to combine operations that are defined declaratively, operations that are defined implicitly, and operations that are defined functionally to evolve the data model according to the variously defined operations, including instantiation mapping evolution, instantiation data evolution, or combinations thereof and wherein application access to any instantiation of the data model associated with an evolution can include further transient transformation of an instant version of an instantiation to an appropriate version to facilitate application access across the data model and instantiation evolution.

* * * * *